United States Patent [19]
MacDonald

[11] Patent Number: 5,949,150
[45] Date of Patent: Sep. 7, 1999

[54] AUTOMATIC WIPER SYSTEM

[76] Inventor: Claude F MacDonald, RR 1, Box 17 Bloomingdale Rd., Saranac Lake, N.Y. 12983

[21] Appl. No.: 08/958,302

[22] Filed: Oct. 27, 1997

[51] Int. Cl.$^6$ ........................................................ H02P 3/00
[52] U.S. Cl. .................................... 307/10.1; 15/DIG. 15; 318/483
[58] Field of Search ...................... 307/9.1, 10.1, 307/116, 118; 318/483, DIG. 2; 219/202, 203; 361/178; 340/602; 73/53.01; 15/250.001, 250.05, 250.12, DIG. 15

[56] References Cited

U.S. PATENT DOCUMENTS

| | | |
|---|---|---|
| 4,131,834 | 12/1978 | Blaszkowski ............................ 318/483 |
| 5,306,992 | 4/1994 | Droge . |
| 5,428,277 | 6/1995 | Stanton . |
| 5,453,676 | 9/1995 | Agrotis et al. . |
| 5,493,190 | 2/1996 | Mueller . |
| 5,581,240 | 12/1996 | Egger . |
| 5,668,478 | 9/1997 | Buschur ................................... 318/483 |
| 5,801,539 | 9/1998 | Schröder .................................. 318/483 |

Primary Examiner—Richard T. Elms
Attorney, Agent, or Firm—Michael I. Kroll

[57] ABSTRACT

An automatic windshield wiper system connected to a source of power and windshield wipers of a vehicle for automatically controlling operation of the windshield wipers based upon an intensity of falling precipitation. The automatic windshield wiper system includes a transducer for sensing precipitation and generating a signal indicative of the sensed precipitation and a comparator connected to receive the control signal. The comparator analyzes the control signal to determine whether precipitation is falling. A relay is connected between the comparator and the windshield wipers. The relay is toggled by the comparator to supply power from the power source to activate the windshield wipers upon a determination by the comparator that the transducer sensed falling precipitation, the transducer continually senses the state of falling precipitation and continually transmits signals to the comparator. The comparator toggles the relay between the open and closed states turning the windshield wipers on and off based upon the conditions sensed by the transducer.

13 Claims, 6 Drawing Sheets

AUTOMATIC WIPER SYSTEM

The content of the present application has been included in Disclosure Document No. 419012 entitled "AWS Automatic Wiper System" filed with the United States Patent and Trademark Office on May 2, 1997.

BACKGROUND OF THE INVENTION

1. Field of the Invention

The present invention relates generally to windshield wiper systems and, more specifically, to a system for automatically starting the windshield wipers of a vehicle upon sensing precipitation.

2. Description of the Prior Art

Numerous windshield wiper systems have been provided in the prior art. Conventional wiper systems are manually operated and controlled by the driver of the vehicle. These systems are adjustable in terms of speed of the windshield wipers and controlled by the driver based upon visibility. These windshield wipers are normally adjustable between three speed positions, an intermittent position in which there is a delay between cycles of the wipers, a slow position and a fast position. However, none of these systems are able to automatically activate the windshield wipers upon sensing precipitation. While these units may be suitable for the particular purpose to which they address, they would not be as suitable for the purposes of the present invention as heretofore described.

SUMMARY OF THE PRESENT INVENTION

The present invention relates generally to windshield wiper systems and, more specifically, to a system for automatically starting the windshield wipers of a vehicle upon sensing precipitation.

A primary object of the present invention is to provide an automatic windshield wiper system that will overcome the shortcomings of prior art devices.

Another object of the present invention is to provide an automatic windshield wiper system which is able to automatically activate the windshield wipers upon sensing precipitation.

An additional object of the present invention is to provide an automatic windshield wiper system including a sensor for determining the intensity of the precipitation.

A further object of the present invention is to provide an automatic windshield wiper system able to control the frequency of the windshield wipers based upon the sensed intensity of the precipitation as well as operate the windshield wipers in an intermittent mode.

A still further object of the present invention is to provide an automatic windshield wiper system able to control the windshield wipers to operate at a constant speed.

A yet further object of the present invention is to provide an automatic windshield wiper system including a transducer which is heated to evaporate any precipitation falling thereon, the temperature to which the transducer is heated being in direct proportion to the intensity of falling precipitation for controlling the frequency and mode of operation at which the windshield wipers are operating.

Another object of the present invention is to provide an automatic windshield wiper system that is simple and easy to use.

A still further object of the present invention is to provide an automatic windshield wiper system that is economical in cost to manufacture.

Additional objects of the present invention will appear as the description proceeds.

An automatic windshield wiper system connected to a source of power and windshield wipers of a vehicle for automatically controlling operation of the windshield wipers based upon an intensity of falling precipitation is disclosed by the present invention. The automatic windshield wiper system includes a transducer for sensing precipitation and generating a signal indicative of the sensed precipitation and a comparator connected to receive the control signal. The comparator analyzes the control signal to determine whether precipitation is falling. A relay is connected between the comparator and the windshield wipers. The relay is toggled by the comparator to supply power from the power source to activate the windshield wipers upon a determination by the comparator that the transducer sensed falling precipitation, the transducer continually senses the state of falling precipitation and continually transmits control signals to the comparator. The comparator toggles the relay between the open and closed states turning the windshield wipers on and off based upon the conditions sensed by the transducer.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DETAILED DESCRIPTION OF THE PREFERRED EMBODIMENT

Figure 1:
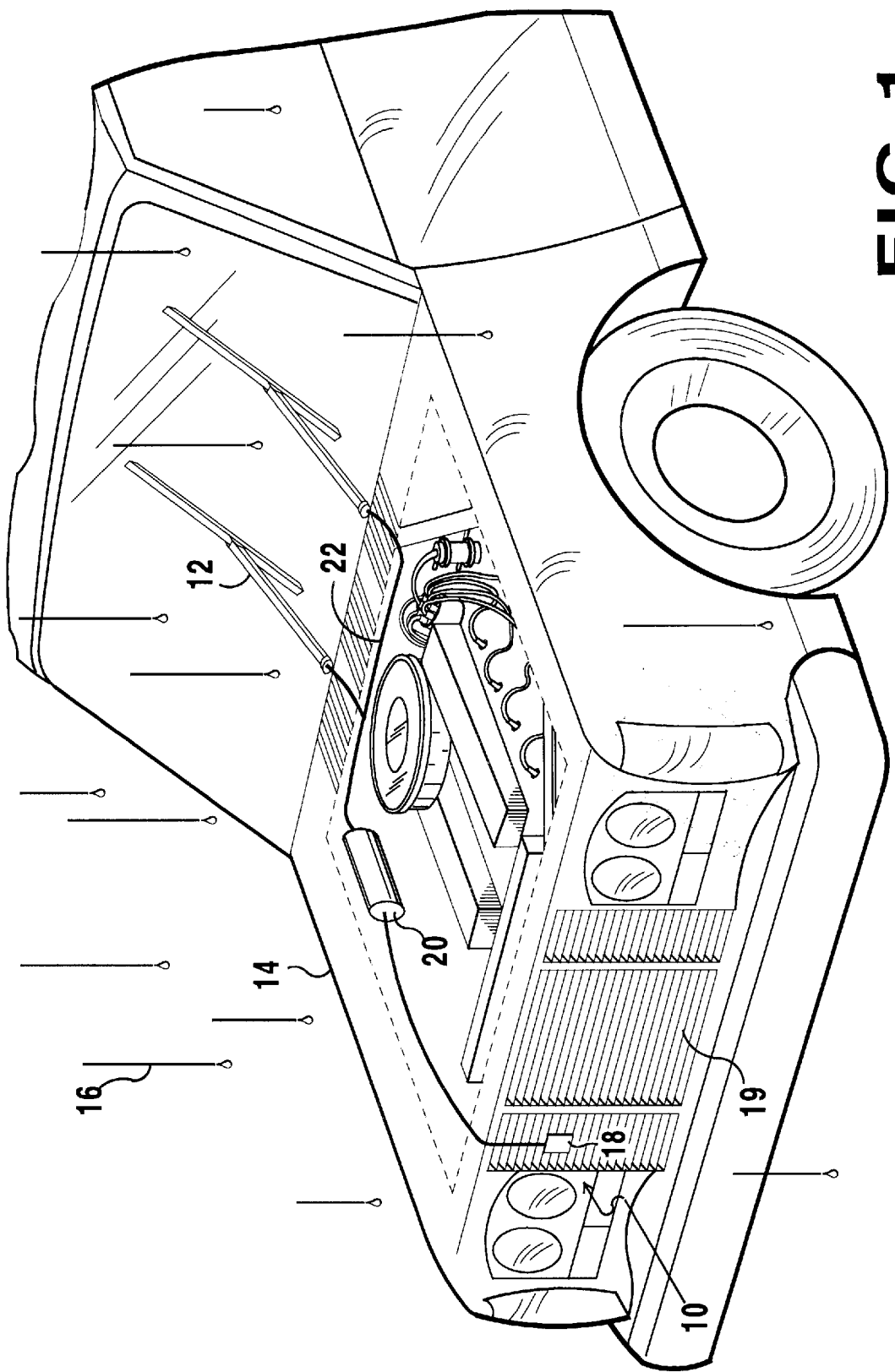
FIG. 1 is a front perspective view of the automatic windshield wiper system of the present invention incorporated in an automobile.

Turning now descriptively to the drawings, in which similar reference characters denote similar elements throughout the several views, FIGS. 1 through 5 illustrate the automatic windshield wiper system indicated generally by the numeral 10.

The automatic windshield wiper system 10 is connected to the windshield wipers 12 and installed within a vehicle 14 as is illustrated in FIG. 1. The automatic windshield wiper system 10 is able to sense when precipitation 16 such as rain, snow, hail, drizzle, fog, etc. is falling on the vehicle 14 and acts to activate the windshield wipers 12 of the vehicle 14 to operate based upon the intensity of the falling precipitation 16 as will be described hereinafter. The windshield wipers 12 can be operated to move in a constant speed mode or an intermittent operation mode. The vehicle 14 shown in the presently explained example is an automobile however it is to be realized that the use of the automatic windshield wiper system 10 of the present invention is not limited to automobiles. The automatic windshield wiper system 10 may also be used in any type of vehicle including and not limited to an airplane, boat, van, truck, tractor trailer, 4 wheel drive vehicles, recreational vehicle, etc. The present invention is thus not meant to be limited by the type of vehicle in which it is installed but may be installed in any device that is used to detect falling precipitation and react thereupon.

The automatic windshield wiper system 10 includes a transducer 18 preferably positioned on a front side or grill 19 of the vehicle 14 or in a position to sense precipitation falling on the surface acted upon by the windshield wipers 12. The transducer 18 is connected to a windshield wiper control circuit 20 for controlling the windshield wipers 12 of the vehicle 14 and receives power through the windshield wiper control circuit 20. The power source (not shown) is preferably the vehicle battery. However, the power source may be an auxiliary power source within the vehicle 14 or structure to which the automatic windshield wiper system 10 is connected. The type of power source used is a design decision that forms no part of the present invention. By connecting the automatic windshield wiper system 10 to the vehicle battery it is possible to prevent the automatic windshield wiper system 10 from draining the source of power by preventing operation when the vehicle 14 is not in use.

Figure 2:
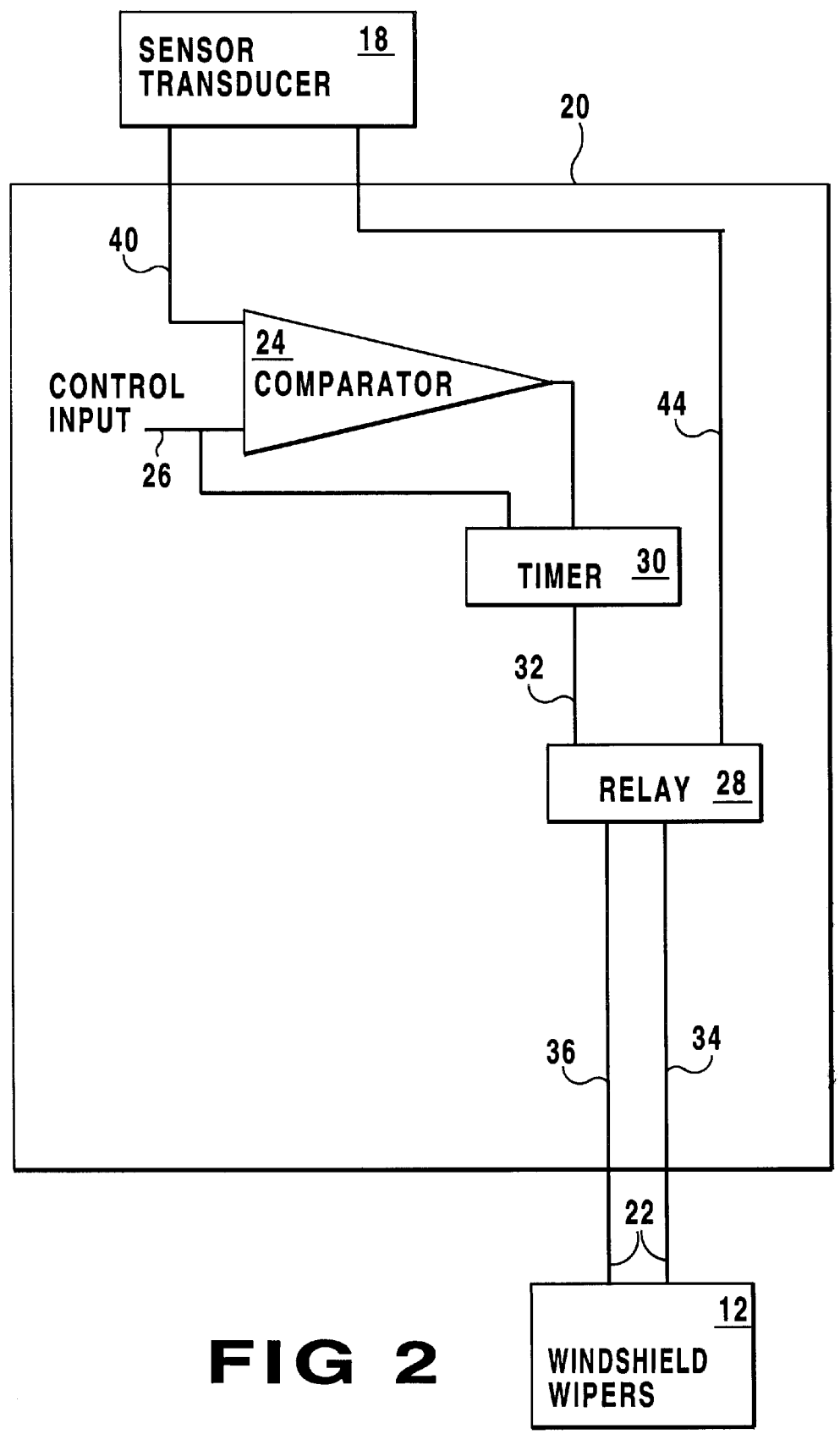
FIG. 2 is a block diagram of the automatic windshield wiper system of the present invention.

A block diagram illustrating the individual components of the automatic windshield wiper system 10 of the present invention can be seen from FIG. 2. This diagram illustrates the connection of the transducer 18 to the windshield wipers 12 of the vehicle 14 via the windshield wiper control circuit 20. The windshield wiper control circuit 20 includes a comparator 24, a relay 28 and a timer circuit 30. The transducer 18 is preferably positioned at a front end of the vehicle 14 and connected to both the comparator 24 and relay 28. The transducer 18 senses the presence or absence of precipitation contacting the surface acted upon by the windshield wipers 12 and transmits a signal indicative of the sensed condition to a first input terminal of the comparator 24. The comparator 24 also receives a control input 26 at a second input terminal thereof. The comparator 24 compares these two inputs to determine if the transducer 18 has sensed any precipitation. When the transducer 18 senses precipitation falling it will transmit a control signal to the comparator 24 causing the output of the comparator 24 to change. The output of the comparator 24 is connected to the timer 30 which is activated upon receipt of a control signal from the comparator 24 indicating precipitation has been sensed. The control input 26 is also transmitted directly to the timer 30.

The transducer 18 is also connected to trigger the relay 28 upon sensing precipitation. The relay 28 is also connected to receive a toggling signal from the timer 30. Upon receipt of the toggling signal from either the transducer 18, the timer 32 or both the windshield wipers 12 are placed in an activated state to clear precipitation falling on the windshield of the vehicle 14. The speed at which the windshield wipers 12 are caused to move is dependent upon the value of the control signal received by the comparator 24 and in turn the toggling of the relay switches 28 as will be explained in more detail hereinafter.

Figure 3:
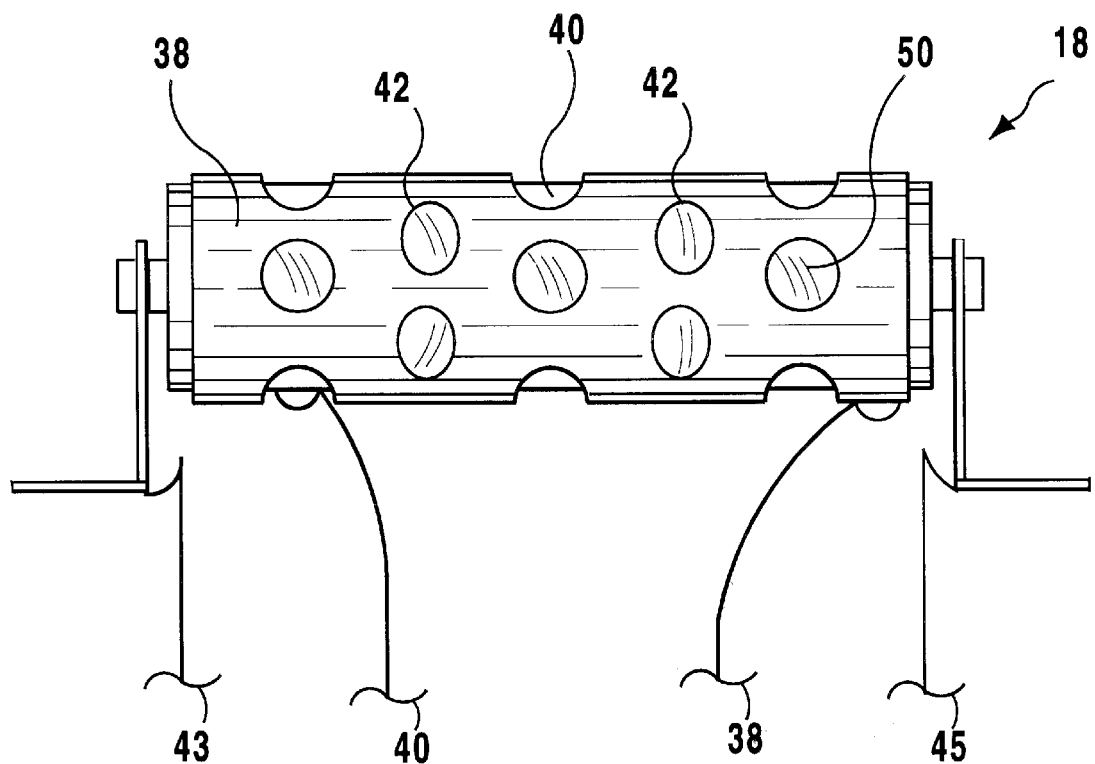
FIG. 3 is a perspective view of the sensor/transducer of the automatic windshield wiper system of the present invention.
Figure 4:
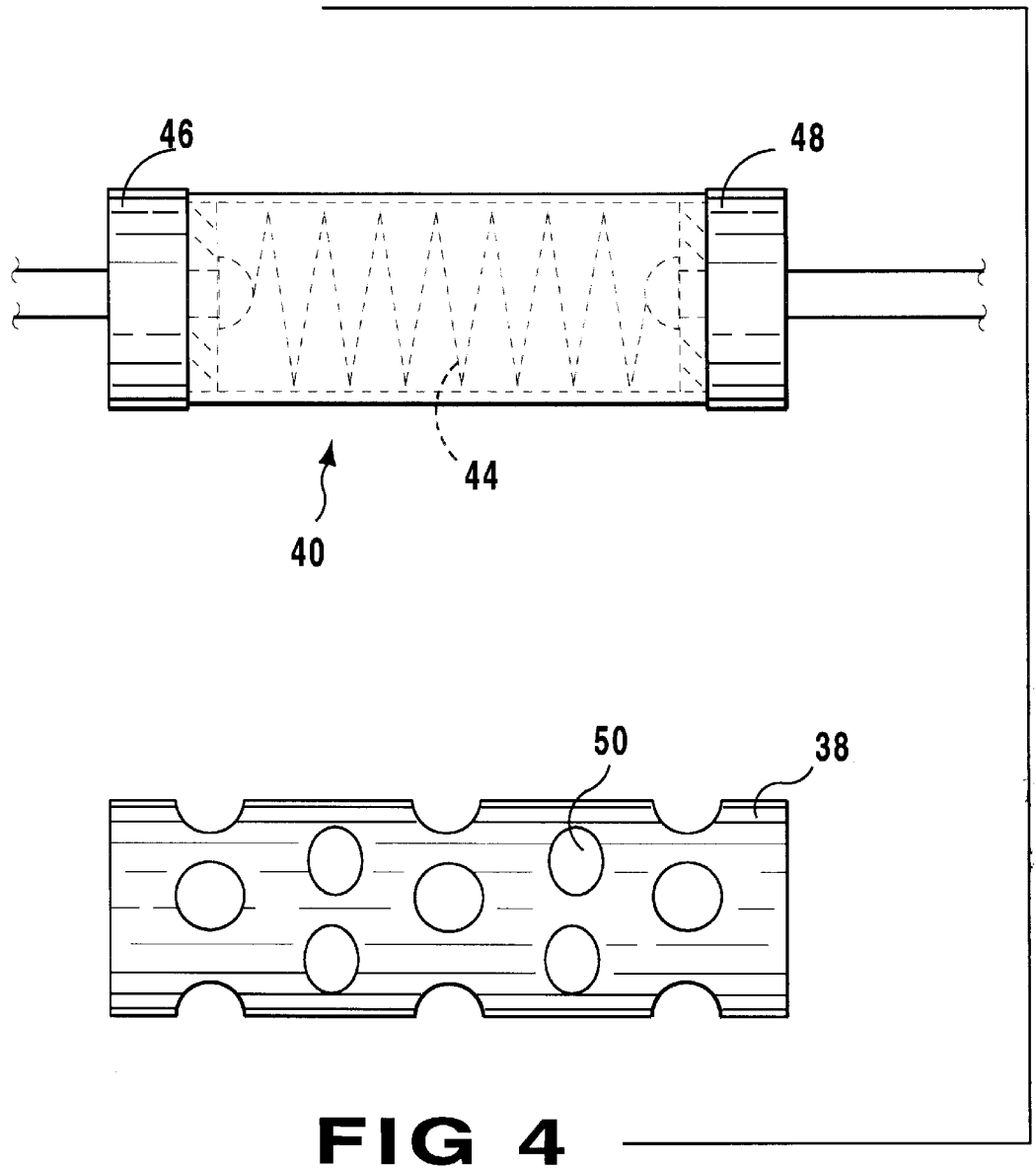
FIG. 4 is an exploded view of the sensor/transducer of the automatic windshield wiper system of the present invention.

The transducer 18 is depicted in more detail in FIGS. 3 and 4. The transducer 18 includes an outer tube 38 and an inner tube 40. The outer tube 38 is cylindrical in shape forming a recess extending therethrough and the inner tube 40 is positioned within the recess formed by the outer tube 38. The inner and outer tubes 38 and 40 are both insulated and positioned to be separated by a minute distance, preferably a few thousandths of one inch. The inner and outer tubes 38 and 40 are also preferably made of stainless steel to prevent corrosion although any other material which will be resistant to corrosion and maintain the conductive properties needed for proper operation of the device may be used. The outer tube 38 includes a plurality of holes 42 drilled therein for allowing precipitation falling on the transducer 18 to pass therethrough and contact the inner tube 40. The inner tube 40 includes a heating element 44 extending therethrough. The heating element 44 extends through the entire length of the inner tube 40 and connects to the windshield wiper control circuit 20 via first and second leads 43 and 45, respectively, extending from either end thereof. Positioned on a first end of the inner tube 40 is a first stepped insulator 46 and a second stepped insulator 48 is positioned on the opposing end of the inner tube 40. The first and second stepped insulators 46 and 48 act to maintain the distance between the outer and inner tubes 38 and 40 and insulates the inner tube 40 and the heating element 44 from the outer tube 38. The encircling of the inner tube 40 by the outer tube 38 allows precipitation to pass through the drilled holes 42 and contact the surface of the inner tube 40 wherein a precipitation sensor 56 is positioned for triggering the windshield wiper control circuit 20 upon determining that precipitation is falling. If no precipitation is falling, such is detected by the precipitation sensor 56 and the first relay park switch 50 which is connected in series with the windshield wiper park wire will remain in an on position. When the wiper slow switch 52 is in the off position, the heater switch 54 will be in the off position as will be described with reference to FIG. 5 hereinafter.

Figure 5:
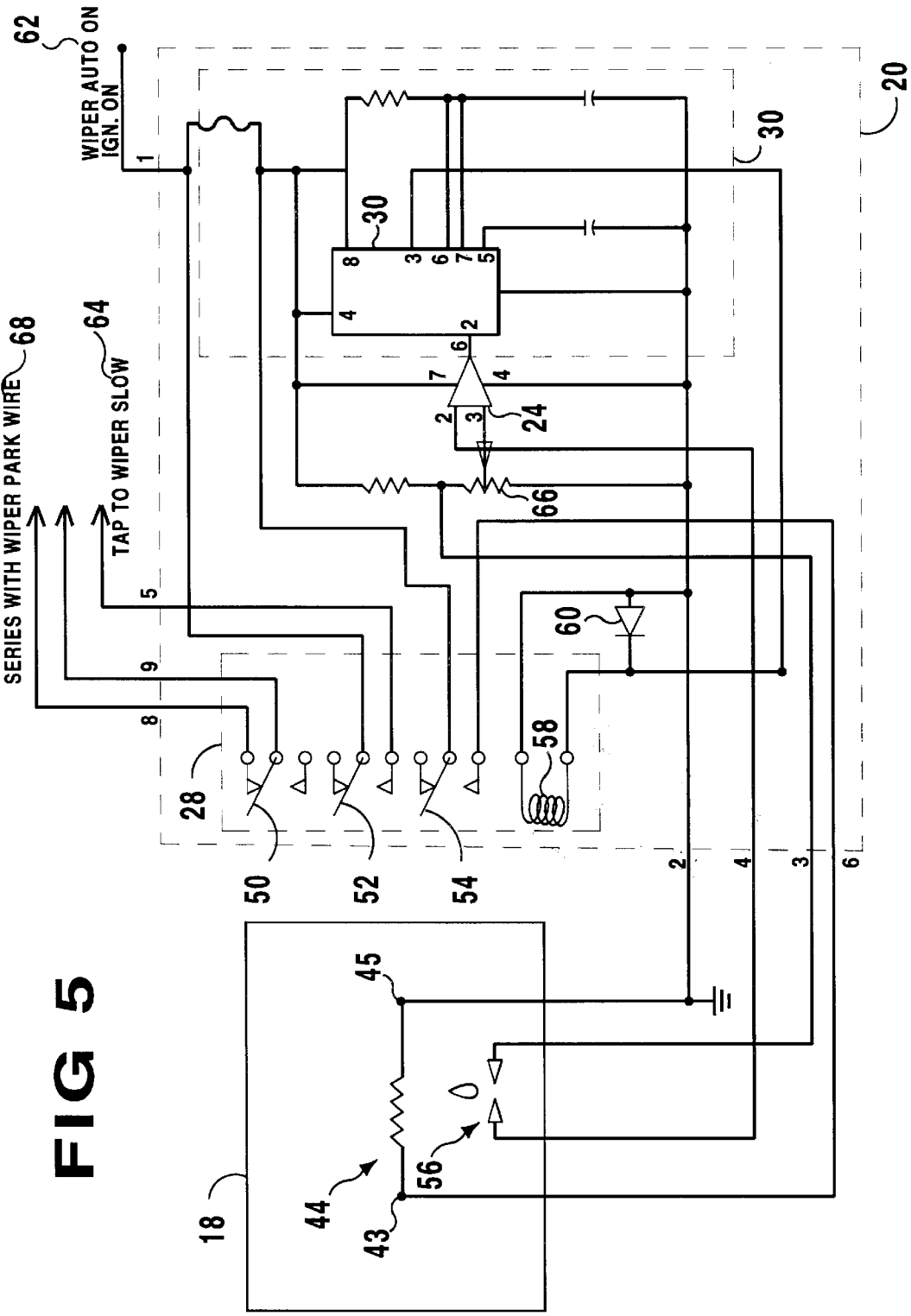
FIG. 5 is a circuit diagram of the automatic windshield wiper system of the present invention.

The automatic windshield wiper system 10 will now be described in detail with reference to the schematic diagram of FIG. 5. The transducer 18 is illustrated as including heating element 44 and precipitation sensor 56 positioned therein. The heating element 44 is connected at the first lead 43 to the third relay heater switch 54 of the relay 28 and is connected at the second lead 45 to ground. Relay coil 58 is connected between ground and timer 30 and has a diode 60 connected in parallel to prevent back E.M.F. The precipitation sensor 56 is connected to the comparator 24 and lower positive voltage from the wiper auto switch 62. When the wiper auto switch 62 is toggled to the on position, the precipitation sensor 56 is powered to sense precipitation. Upon sensing precipitation, the precipitation sensor 56 signals the comparator 24 to switch from positive to negative. This triggers the timer circuit 30 on; which in turn sends a positive voltage to relay coil 58. Relay 28 is turned on, wiper park switch 50 is turned off; wiper slow switch 52 is turned on; which activates the wipers on to slow speed, transducer heater switch 54 is turned on; thus heating sensor 56. The longer voltage is applied to the heating element 44 the hotter it will become providing it is not cooled by the intensity of the rain. This determines the frequency of wiper operation, whether it is steadily on or intermittenly on.

If the heating element 44 is heated to a temperature that evaporates the precipitation faster than it falls it will continue to toggle the second relay wiper switch 52 between the open and closed states causing power to be intermittently applied to the windshield wipers 12 and thus the windshield wipers 12 will operate in an intermittent mode.

Figure 6:
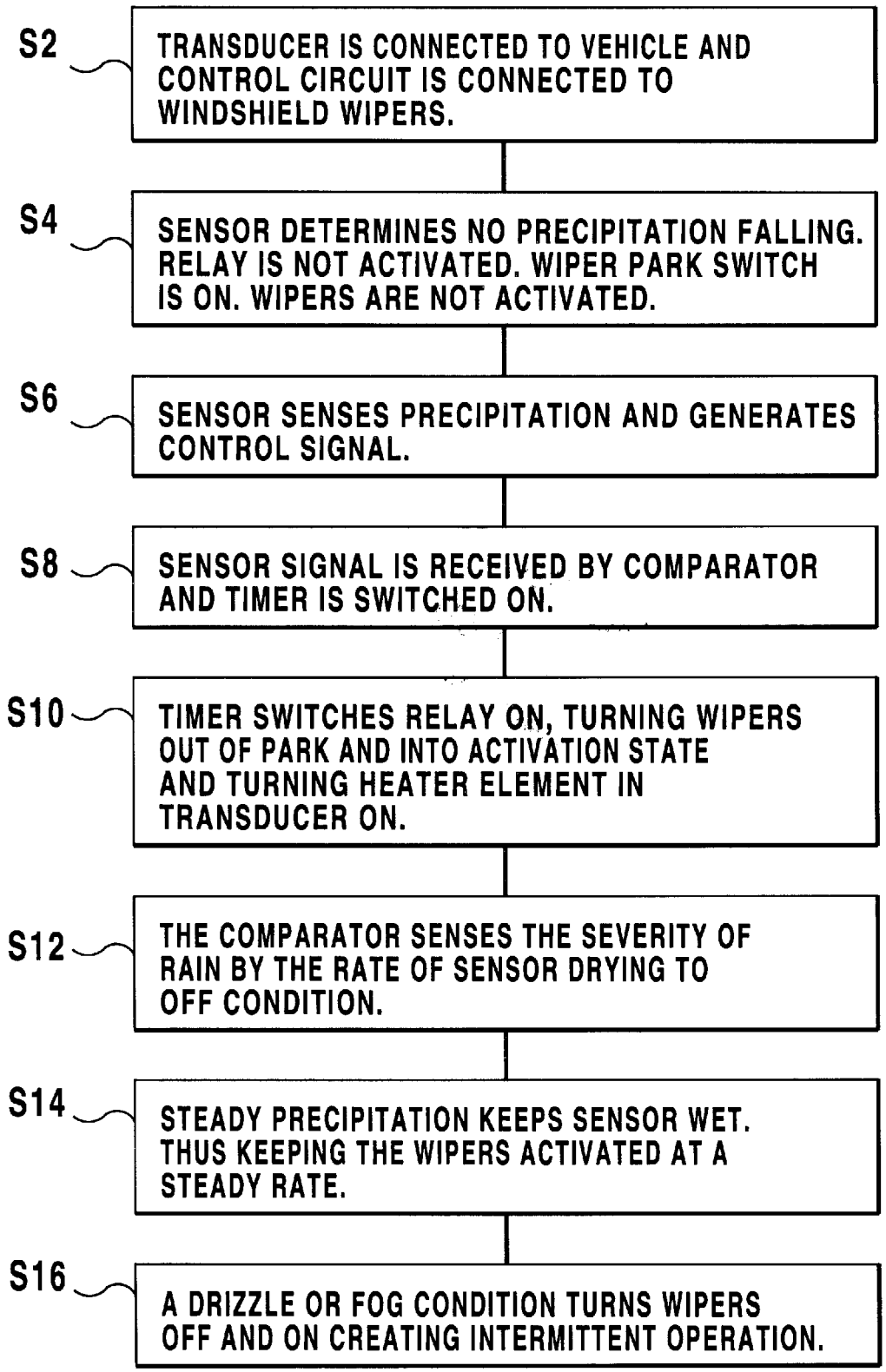
FIG. 6 is a flow chart illustrating the operating process of the automatic windshield wiper system of the present invention.

The operation of the automatic windshield wiper system 10 will now be described with reference to the figures and specifically FIG. 6. In operation, the automatic windshield wiper system 10 is installed in the vehicle 14 and connected to the windshield wiper control circuit 20. This is performed by connecting the transducer 18 to the vehicle 14, preferably at a position on the front grill or front end, and connecting the windshield wiper control circuit 20 to the windshield wipers 12 as described in step S2. The auto switch is turned on and the automatic windshield wiper system 10 is now active. The precipitation sensor 56 is now constantly sensing if precipitation is falling. If no precipitation is sensed the relay is not activated and the windshield wipers 12 remain in the off inactivated state as stated in step S4.

When the precipitation sensor 56 senses that precipitation is falling a control signal is generated and transmitted to the comparator 24 as described in step S6. Upon receipt of the control signal from the precipitation sensor 56 indicating precipitation is falling, the comparator 24 generates an output signal indicative of such and triggers on the timer 26 as stated in step S8. The timer switches on the relay 28 to trigger the wiper park switch 68 out of the park position and into an on activated state. This also turns the heater element 44 within the transducer 18 on and the heater element 44 begins to warm up as power is applied thereto causing the precipitation to evaporate from the surface of the inner tube 40 as described in step S10. The severity of the precipitation is sensed by the comparator 24 based upon the rate at which the inner tube 40 dries. If the inner tube 40 dries faster than the rate at which the precipitation is falling the control signal transmitted to the comparator 24 changes the output of the comparator 24 thus indicating the precipitation is falling at a slow rate. If the heating element 44 must be heated to a greater temperature to evaporate the precipitation falling thereon the precipitation sensor 56 will continue to sense the falling precipitation and the control signal transmitted to the comparator 24 will remain constant thus indicating the precipitation is falling at a more intense rate. This is described in step S12 of FIG. 6.

When the precipitation falls at a steady rate, the inner tube 40 and thus the precipitation sensor 56 remains wet and thus continues to sense the falling precipitation. This causes a control signal indicating the sensing of falling precipitation to be transmitted to the comparator 24 and the comparator output to continue to trigger on the timer circuit 30. The timer circuit 30 in turn holds the relay 28 and the wiper park switch 68 out of the park position and in the on activated state. Thus, continuing to provide power to the heater element 44 within the transducer 18 causes the heater element 44 to remain heated and the precipitation to evaporate from the inner tube 40. As long as power is continually supplied to the heater element 44, the second relay wiper switch 52 remains in the active state applying power to the windshield wipers 12 to keep the windshield wipers 12 activated at a steady rate as described in step S14.

When a drizzle or fog condition is sensed by the precipitation sensor 56, the heater element 44 is able to evaporate the precipitation on the inner tube 40 faster than the precipitation is able to fall and thus the precipitation sensor 56 continually changes the generated control signal. The control signal fluctuates between values indicative of sensing no precipitation and falling precipitation. This causes the control signal transmitted to the comparator 24 and thus the comparator output to constantly change. The continual changing of the comparator output causes power to be intermittently supplied to the heater element 44 and the second relay wiper switch 52 to the windshield wipers 12. Thus, the windshield wipers 12 are caused to operate intermittently with the sensing of drizzle or fog by the precipitation sensor 56 as described in step S16.

From the above description it can be seen that the automatic windshield wiper system of the present invention is able to overcome the shortcomings of prior art devices by providing an automatic windshield wiper system which is able to automatically activate the windshield wipers upon sensing precipitation. The automatic windshield wiper system includes a sensor for determining the intensity of the precipitation and is able to control the frequency of the windshield wipers based upon the sensed intensity of the precipitation between an off state, an intermittent operation state, and a constant speed state. The automatic windshield wiper system also includes a transducer which is heated to evaporate any precipitation falling thereon, the temperature to which the transducer is heated being in direct proportion to the intensity of falling precipitation. Furthermore, the automatic windshield wiper system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An automatic windshield wiper system connected to a source of power and windshield wipers of a vehicle for automatically controlling operation of the windshield wipers based upon an intensity of falling precipitation, said automatic windshield wiper system comprising:

a) transducer means for sensing precipitation and generating a control signal indicative of the sensed precipitation;

b) comparator means connected to receive said control signal for analyzing said control signal to determine whether precipitation is falling;

c) relay means connected between said comparator means and the windshield wipers for supplying power from the power source to activate the windshield wipers upon a determination by said comparator means that said transducer means sensed falling precipitation, wherein said transducer means includes a first cylindrical outer tube including a plurality of holes drilled therein, a second inner tube positioned within the outer tube; a precipitation sensor connected to sense precipitation passing through said plurality of holes and contacting said inner tube; and a heating element positioned within said second inner tube for drying precipitation contacting said sensor.

2. The automatic windshield wiper system as recited in claim 1, wherein said relay means includes a first switch connected to turn the windshield wipers on and off, a second switch connected to control heating of said sensors and a third switch connected to move the windshield wipers between operation in an automatic state and an off state.

3. The automatic windshield wiper system as recited in claim 2, wherein said precipitation sensor is connected between said comparator means and said relay means for generating said control signal indicative of said sensed precipitation, transmitting said control signal to said comparator means and toggling said third switch to place the windshield wipers in an automatic operating state upon sensing falling precipitation.

4. The automatic windshield wiper system as recited in claim 3, further comprising a timer circuit connected to said comparator for toggling said first switch to apply power to the windshield wipers upon a determination by said comparator means that said precipitation sensor has sensed precipitation is falling.

5. The automatic windshield wiper system as recited in claim 4, wherein said heating element extending through said inner tube and connected to said timer circuit for heating said inner tube upon a determination precipitation is falling causing precipitation contacting said inner tube to evaporate.

6. The automatic windshield wiper system as recited in claim 5, wherein said inner and outer tubes are separated by a distance.

7. The automatic windshield wiper system as recited in claim 6, wherein said inner and outer tubes are both made of corrosion resistant material.

8. The automatic windshield wiper system as recited in claim 7, wherein said corrosion resistant material is stainless steel.

9. The automatic windshield wiper system as recited in claim 6, wherein said transducer means further includes first and second insulators positioned on opposing sides of said transducer for insulating said heating element from said outer tube.

10. The automatic windshield wiper system as recited in claim 9, wherein said first and second insulators are positioned to maintain said distance between said inner and outer tubes.

11. The automatic windshield wiper system as recited in claim 10, wherein said heating element causes said precipitation sensor to disconnect said system from the windshield wipers upon heating said inner tube to a temperature able to totally evaporate precipitation falling thereon.

12. The automatic windshield wiper system as recited in claim 1, wherein a temperature of said heating element is increased and decreased proportionately with an intensity of sensed precipitation.

13. The automatic windshield wiper system as recited in claim 12, wherein said inner and outer tubes are separated by a few thousandths of one inch.

* * * * *